United States Patent [19]

Hart et al.

[11] Patent Number: 5,203,274

[45] Date of Patent: Apr. 20, 1993

[54] AMPHIBIOUS VEHICLE

[75] Inventors: Douglas S. Hart, Kenai; Larry D. Beller, Soldotna; Robert L. White, Kenai, all of Ak.

[73] Assignee: Crude Tool Works, Homer, Ak.

[21] Appl. No.: 510,971

[22] Filed: Apr. 19, 1990

[51] Int. Cl.⁵ .............................. B63H 1/26
[52] U.S. Cl. .................... 114/270; 114/124; 440/48; 440/5
[58] Field of Search .......... 114/121, 124, 270; 440/5, 48, 3, 111

[56] References Cited

U.S. PATENT DOCUMENTS

| | | | |
|---|---|---|---|
| 559,912 | 5/1896 | Stauber | 440/48 |
| 941,923 | 11/1909 | Hoffman | 440/48 |
| 3,422,790 | 1/1969 | Connell | 114/124 |
| 4,358,280 | 11/1982 | Jeanson et al. | 440/5 |
| 4,476,948 | 10/1984 | Komoto et al. | 114/270 |

FOREIGN PATENT DOCUMENTS 2941246  4/1981  Fed. Rep. of Germany ...... 114/124

Primary Examiner—Jesus D. Sotelo
Assistant Examiner—Stephen P. Avila
Attorney, Agent, or Firm—Flehr, Hohbach, Test, Albritton & Herbert

[57] ABSTRACT

A buoyant boat hull of an amphibious vehicle has concave, quarter cylinder recesses along the sides down from the waterline, such recesses receiving the upper inboard quadrants of helical augers. The recesses confine water between the screw threads and project it directly to the rear for more efficient forward thrust. The engine and pumps for the hydraulic motors are mounted on a slide to be moved forward and aft as desired to shift the center of gravity and aid in transition between land and water travel.

3 Claims, 2 Drawing Sheets

AMPHIBIOUS VEHICLE

BACKGROUND OF THE INVENTION

There is a need for all-terrain vehicle that can be driven through water and swamp, as well as over mud, snow, ice and dry ground, or even a frozen tundra. Such a vehicle could be provided in a small version for recreational use, as in fishing or hunting, or in larger versions for transporting people and payloads to relatively inaccessible areas. Such vehicles could also be used for search and rescue missions over all types of surfaces and in all weather conditions.

OBJECTS OF THE INVENTION

It is an object of this invention to provide an amphibious vehicle that can be propelled through the water as well as over all types of terrain.

It is a further object of this invention to provide an auger-driven, amphibious vehicle wherein the direction of thrust for propulsion through water can be closely controlled for increased efficiency.

It is a further object of this invention to provide an auger-driven amphibious vehicle with weight-shifting means to facilitate transition from water to ground travel.

Other objects and advantages of this invention will become apparent from the description to follow, particularly when read in conjunction with the accompanying drawings.

SUMMARY OF THE INVENTION

In carrying out this invention we provide a buoyant hull in the general configuration of a speedboat. An auger is mounted for rotation along each side of the craft. The generally cylindrical augers with helical screws are nested closely in approximately quarter-cylinder recesses formed along the lower sides of the hull at the waterline so that a considerable portion of the water moved by the augers is contained in the narrow spaces between augers and hull, and is then thrust directly rearward (or forward) for increased efficiency in propulsion. The engine and other components of the driving mechanism are mounted on a slide that may be shifted forward or aft as desired to transfer weight accordingly, thereby to assist in the transition from water to land travel.

DESCRIPTION OF A PREFERRED EMBODIMENT

Figure 1:
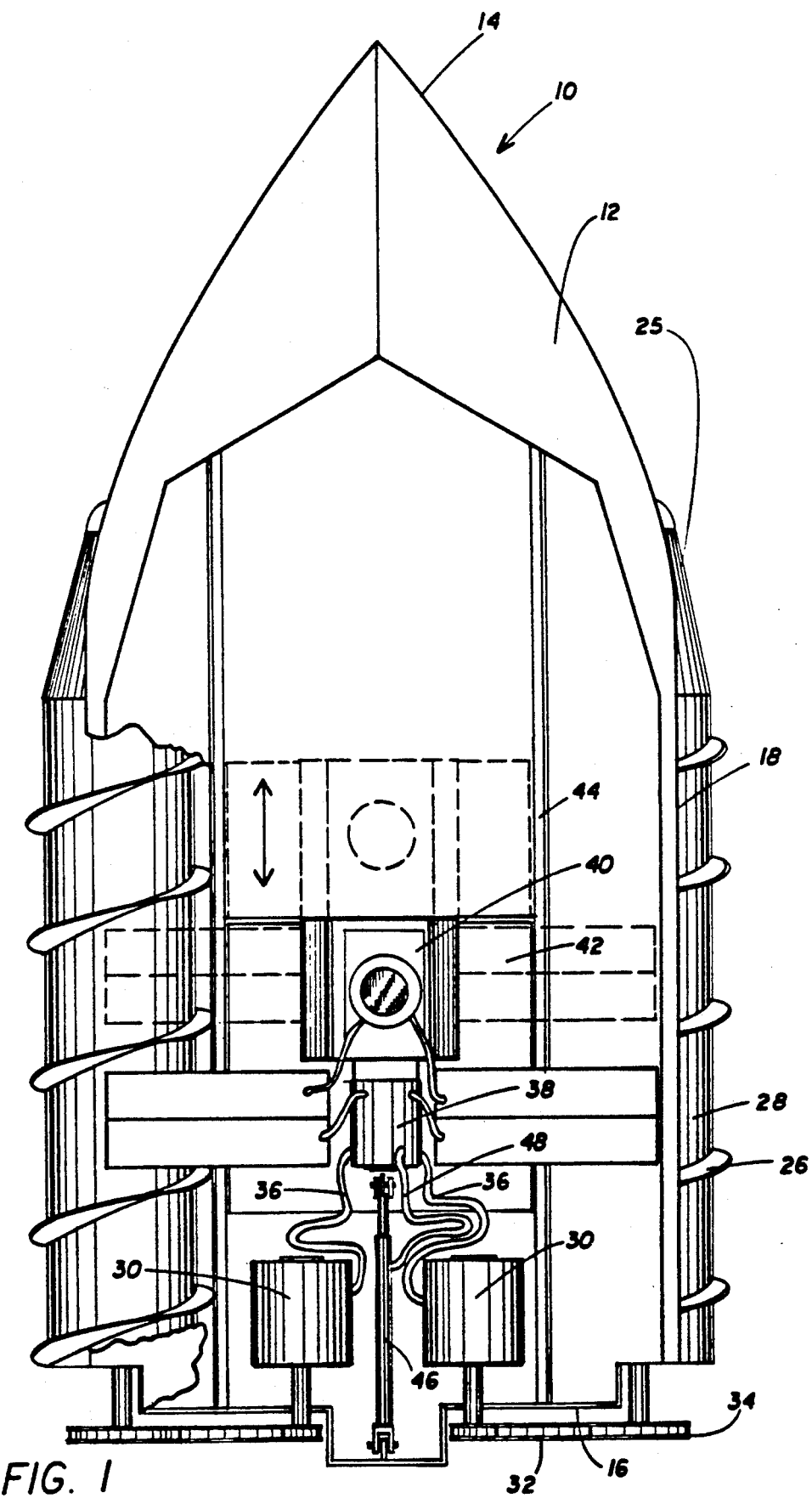
FIG. 1 is a top view partially broken away, of the amphibious vehicle of this invention.
Figure 2:
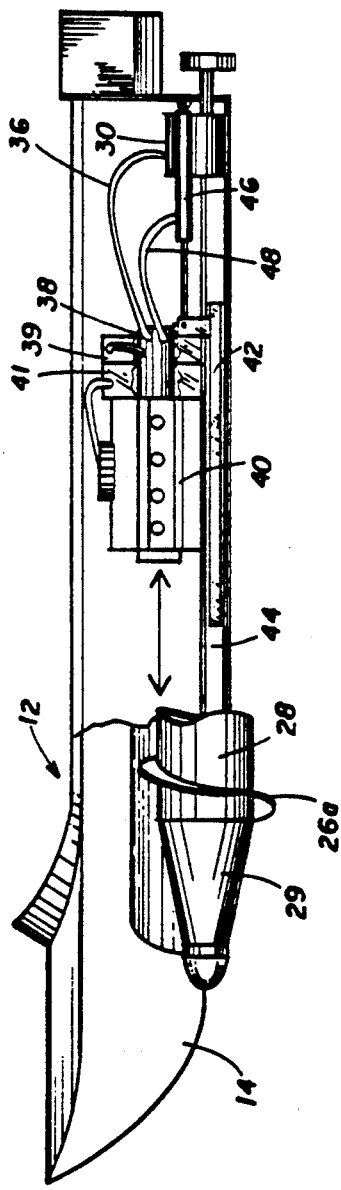
FIG. 2 is a side view of the vehicle partially broken away.

Referring now to FIG. 1 with greater particularity, the amphibious vehicle of this invention 10 has a buoyant hull 12 having a bow 14 a stern 16 and sides 18.

Figure 3:
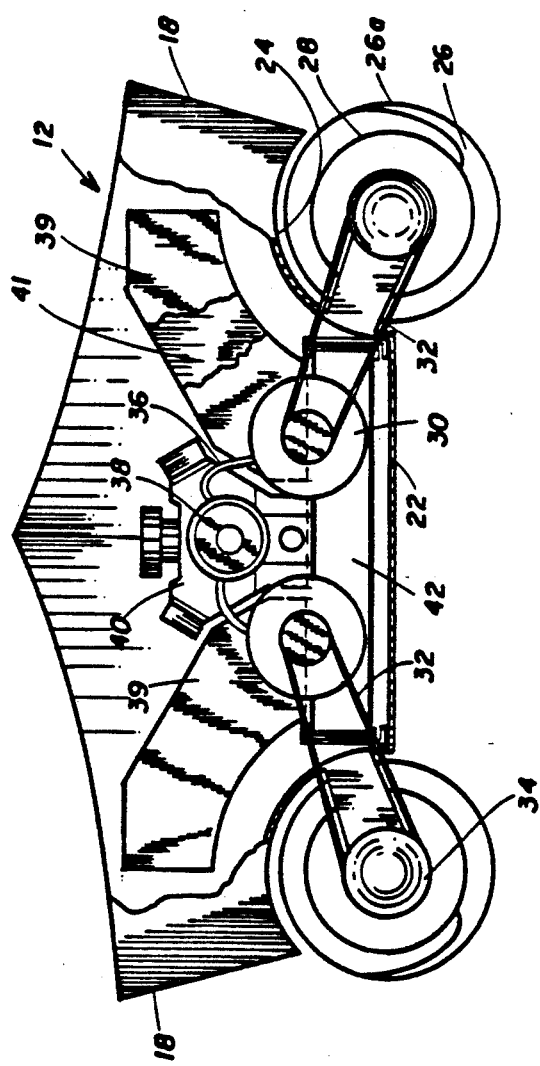
FIG. 3 is a rear view of the vehicle showing the propelling augers.

The bottom 22 (FIG. 3) may be relatively flat, and between the sides 18 and the bottom are internal cylindrical transition surfaces 24. The transition surfaces 24 extend through at least ninety degrees, (90°), and, preferably, are about 120° in extent. Closely received in the cylindrical recesses 24 are the oppositely wound screws 26 of generally cylindrical augers 28. With this arrangement, a substantial percentage of the water moved by the screws is contained within the cylindrical transition surfaces 24 between the screw threads 26, and is thrust directly to the rear for a more efficient forward thrust. In practice, the outer peripheral surfaces of the screws threads 26 may be approximately three feet in diameter with the cylindrical cores 28 of the augers about two feet in diameter, and we may provide a clearance of approximately one inch between such outer surfaces 26a, and the cylindrical transition surface 24 of the hull 12. Preferably, the auger cores 28 taper down at their forward ends 29 to nearly conical configuration.

The helical screws 26 may be formed from strong steel plate, as for example, about one inch in thickness. The threads 26 are preferably about perpendicular to the surface of the cylindrical cores 28 so that they propel the craft effectively through water either forward or aft. In addition, the heavy screws of steel plate form very effective "cleats" for travel over any ground, be it marshalling or frozen tundra.

The screws 26 could be formed by cutting out rings from steel plate to fit over the auger cores 28. The rings are split and bent into helical sections, which may be welded end to end, and to the cylindrical core 28, to complete the full length, uninterrupted helical wrap. The auger cores 28 may be hollow or filled with a buoyant material.

The vehicle auger screws 26 may be driven by hydrostatic motors 30 through chains 32 and sprockets 34, the pressurized hydraulic fluid being delivered through flexible lines 36 from suitable pumps 38. The pumps 38 are driven by a suitable internal combustion engine 40, such as an eight cylinder diesel engine. Suitable tanks 39 and 41 are provided for the hydraulic fluid and diesel fuel, respectively.

In the alternative, the hydrostatic motors 30 may be mounted on the hull 12 in axial alignment with the augers 28 for direct drive thereof. Again, the hydrostatic motors 30 are driven by pressurized hydraulic fluid, which is delivered through flexible line 36.

For straight travel, either forward or in reverse the augers 26 are driven in opposite rotary directions. For turning, one auger 26 may be slowed, stopped or even reversed.

As another feature of this invention, the internal combustion engine 40, weighing several hundred pounds, is mounted on a slide 42, which is slidably received in parallel longitudinal channel-like slideways 44. Hence, a considerable mass may be shifted fore and aft as desired to shift the center of gravity of the craft 12 accordingly, to alter the trim of the amphibious vehicle. For example, the engine may be pulled aft to increase the weight at the rear of the hull 12 and thereby raise the bow 14 in the water, thereby to facilitate the emergence of the hull 12 from water. Then, after the augers are extending over the land, the engine 40 may be shifted forwardly to improve traction for land travel.

Shifting of the engine 40 fore and aft may be achieved by a hydraulic ram 46 which is supplied from the pumps 38, as by hoses 48.

Because of the flexible hoses 36, the internal combustion engine 40 and pumps 38 may be moved relative to the stationary hydraulic motors 30, which remain in place to drive the augers in opposite directions, as previously described. Where hydrostatic motors are mounted or the stern of the boat 12 to drive the augers 28 directing the movement of the engine 40 and pumps 38 are simply absorbed in the hoses 36.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. An amphibious vehicle comprising:
   a buoyant hull having a bottom and generally upright sides;
   said sides being formed to merge with said bottom in concave cylindrical transition recess surfaces; and
   a pair of augers rotatable mounted along the sides of said hull closely nested in said recess surfaces;
   each said auger being of elongated generally cylindrical configuration and having a continuous, helical screw extending around it from front to rear;
   the screws of said augers being of opposite threads;
   the upper inboard quadrants of said augers being contained within said recess surfaces and the lower outboard and inboard quadrants thereof depending below said bottom of the hull whereby when said vehicle is afloat in water the auger will propel the vehicle through the water and when the vehicle is on land or other firm surfaces, the auger will move the vehicle by traction.

2. The amphibious vehicle defined by claim 1 including:
   fluid-driven means for driving said augers in opposite rotary directions;
   a prime mover and a pump driven by said prime mover;
   flexible lines connecting the output of said pump to said fluid-driven means
   a slide supporting said prime mover and said pump;
   a slideway receiving said slide for movement fore and aft of said full; and
   a hydraulic ram on said hull for driving said slideway.

3. An amphibious vehicle comprising:
   a buoyant hull having a bottom and generally upright sides and a concave recess below each side;
   a pair of augers rotatable mounted along the sides of said hull within said recesses and extending below said bottom;
   fluid-driven means for driving said augers in opposite rotary directions;
   a prime mover and a pump driven by said prime mover;
   flexible lines connecting the output of said pump to said fluid-driven means;
   a slide supporting said prime mover and said pump;
   a slideway receiving said slide for movement fore and aft of said hull; and
   a hydraulic ram on said hull for driving said silde.

* * * * *